(12) United States Patent
Fogelstrom

(10) Patent No.: US 7,089,815 B2
(45) Date of Patent: Aug. 15, 2006

(54) AIR BRAKE SYSTEM CHARACTERIZATION BY SELF LEARNING ALGORITHM

(75) Inventor: Kenneth A. Fogelstrom, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 297 days.

(21) Appl. No.: 10/813,939

(22) Filed: Mar. 31, 2004

(65) Prior Publication Data

US 2005/0220634 A1   Oct. 6, 2005

(51) Int. Cl.
 *G01N 19/00* (2006.01)
(52) U.S. Cl. ............... 73/865.9; 73/1.57; 702/98
(58) Field of Classification Search ............ 73/1.57, 73/1.59, 865.9; 702/98
See application file for complete search history.

(56) References Cited

U.S. PATENT DOCUMENTS

| | | | | |
|---|---|---|---|---|
| 4,537,038 A | * | 8/1985 | Alsenz et al. | 62/118 |
| 4,755,803 A | * | 7/1988 | Shockley et al. | 340/452 |
| 6,120,107 A | * | 9/2000 | Eslinger | 303/1 |
| 6,318,817 B1 | * | 11/2001 | Martin et al. | 303/116.1 |
| 2005/0273227 A1 | * | 12/2005 | Fogelstrom | 701/29 |

* cited by examiner

*Primary Examiner*—Hezron Williams
*Assistant Examiner*—Nashmiya Fayyaz
(74) *Attorney, Agent, or Firm*—Jeffrey P. Calfa; Dennis K. Sullivan; Susan L. Lukasik

(57) ABSTRACT

Vehicles equipped with air brake systems and onboard vehicle management computers may be programmed to determine normal operating variables for the air compressor system used for maintaining air brake system pressure. The algorithm used determines normal compressor cut-in and cut-out pressures and actual rise times from cut-in to cut-out by compensating for periods of exogenous air pressure demand.

4 Claims, 6 Drawing Sheets

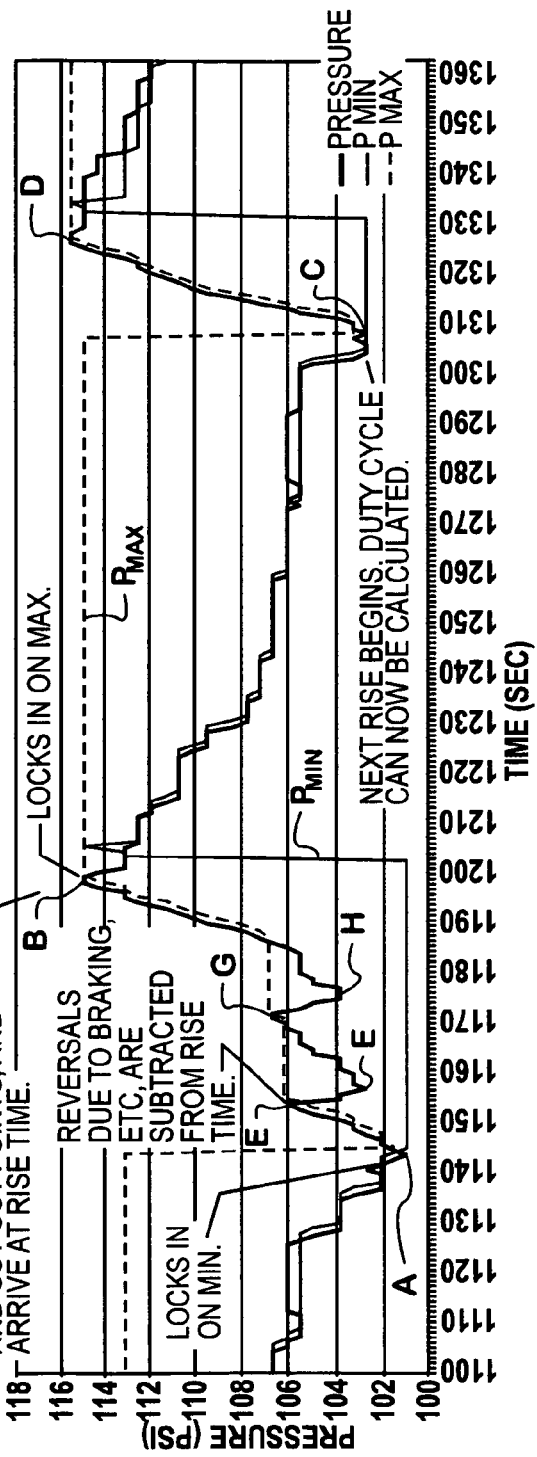
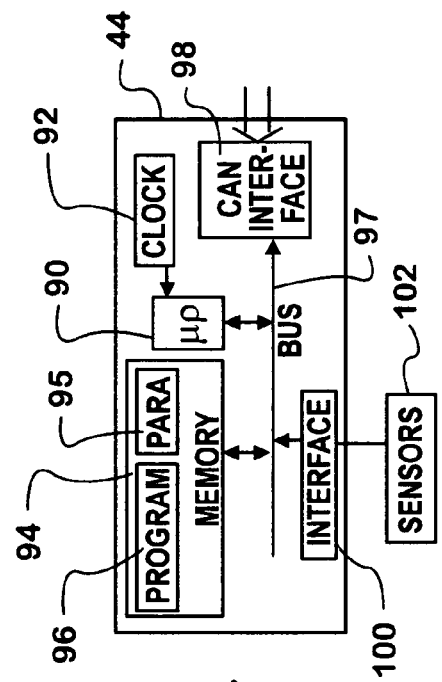

AIR BRAKE SYSTEM CHARACTERIZATION BY SELF LEARNING ALGORITHM

BACKGROUND OF THE INVENTION

1. Technical Field

The invention relates to air brake systems for motor vehicles and more particularly to providing an air compressor system in which a vehicle body computer is programmed to learn normal operating ranges for air brake systems, including particularly the compressor cut-in and cut-out pressures.

2. Description of the Problem

Air compressors on trucks can supply pressurized air to air brake systems for the truck, to any trailers pulled by the truck and to other vehicle systems such as air suspension systems. The operation of the air compressor system is critical to truck operation for engaging the brakes for stopping. For this reason the periodic verification of operation of the compressor and air brake system is important for insuring safe operation of the vehicle and has been made the subject of government regulations.

The air compressor on a truck is typically under the control of a governor which triggers compressor operation in response to falling system pressure. The point where compressor operation engages is called the cut-in pressure. The governor further responds to pressure in the system reaching an upper limit at which point it causes the air compressor to discontinue supplying pressurized air. This point is called the cut-out pressure.

Air compressor system performance varies by manufacturer, by age of the system and by its state of repair. Systems differ in the number of compressed air tanks and in the capacity of those tanks. Some vehicles are equipped with air suspensions which make independent demands on compressed air. Leakage rates vary from system to system and still other factors may effect operation. When new or in good repair an air compressor system should operate at close to its optimal levels. With age and deterioration of the system, the system may come to fall short of these optimal operating values. Inspection regimens should detect failure of a system to operate close to original specification.

Inspection regimens must be established to comply with government regulations. These regimens check variables such as compressor governor cut-out, governor cut-in and monitor gauge pressure against a clock to determine charge build time. A representative procedure requires a driver or operator to:

"Check Air Compressor Governor Cut-in and Cut-out Pressures. Pumping by the air compressor should start at about 100 psi and stop at about 125 psi. (Check manufacturer's specifications.) Run the engine at a fast idle. The air governor should cut-out the air compressor at about the manufacturer's specified pressure. The air pressure shown by your gauge(s) will stop rising. With the engine idling, step on and off the brake to reduce the air tank pressure. The compressor should cut-in at about the manufacturer's specified cut-in pressure. The pressure should begin to rise."

"Check Rate of Air Pressure Buildup. When the engine is at operating rpm, the pressure should build from 85 to 100 psi within 45 seconds in dual air systems. (If the vehicle has larger than minimum air tanks, the buildup time can be longer and still be safe. Check the manufacturer's specifications.) In single air systems (pre-1975), typical requirements are pressure buildup from 50 to 90 psi within three minutes with the engine at an idle speed of 600–900 rpm."

Making these determinations manually and daily is obviously time consuming. In addition, the pressure gauges used in making the tests are frequently imprecise and difficult to read.

It would be desirable to equip vehicles to determine normal compressor system operating variables notwithstanding differences in air pressurization systems from vehicle to vehicle. Operators should not be tempted to provide, or guess at, manufacturer's specifications in implementing an inspection regimen. The possibilities for operator error should be reduced. A system which automatically compensates for the effects of extraneous systems of compressed air availability would be further advantageous.

SUMMARY OF THE INVENTION

According to the invention there is provided an algorithm executable on a body computer, such as an electrical system controller or similar device for a vehicle controller area network, for determining normal operating ranges of a compressed air system installed on a motor vehicle, including governor cut-in and cut-out pressures. The algorithm utilizes air pressure readings from an air pressure sensor located in communication with the compressed air system. The time period between major air pressure deflection points is taken to correspond to compressor cut-out and cut-in. Periods between major deflection points are timed to determine rates of pressure increase. Periods of exogenous air pressure demand are detected and excluded from pressure rise time calculations by determination of the location of minor pressure deflection points. An information processor connected to receive the air pressure signal and utilizing the clock signal is programmed to execute the algorithm.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram of an electrical system controller for a controller area network which may be programmed to implement the invention.

FIG. 5 is a graphical representation of air pressure in a compressed air system used to support operation of air brakes and an air suspension system.

DETAILED DESCRIPTION OF THE INVENTION

Figure 1:
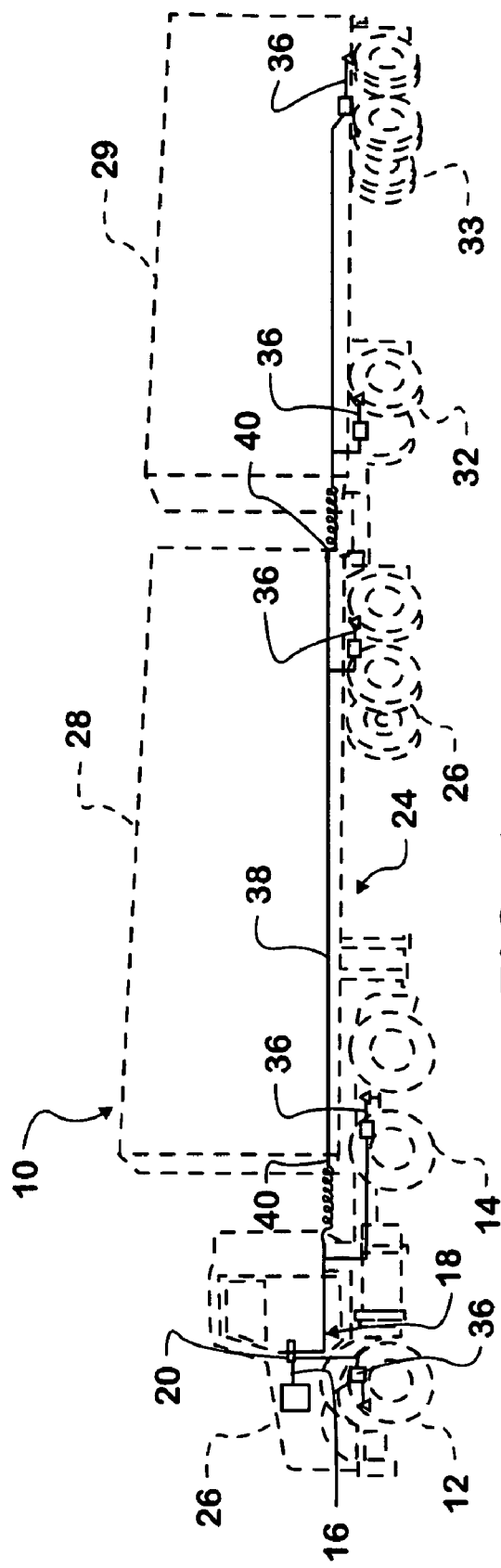
FIG. 1 is a side view of a possible truck/tandem trailer combination illustrating installation of an air brake system with which the invention may be used.

Referring now to the figures and in particular to FIG. 1, a tandem trailer/tractor combination 10 equipped with air brake system 24 is illustrated as possible environments to which the invention can be applied. Tandem trailer/tractor combination 10 includes a tractor 26 and two trailers, 28 and 29, respectively. Tractor 26 and trailers 28, 29 are supported on wheels 12, 14, 26, 32 and 33, the rotation of which may be slowed or stopped using air pressure actuated brakes 36. Air brake system 24 may be considered as including an air pressurization and storage subsystem including a compressor 16, storage tanks 18 and air lines 20, 40 and 38. The details of air brake system 24 are otherwise conventional.

Figure 2:
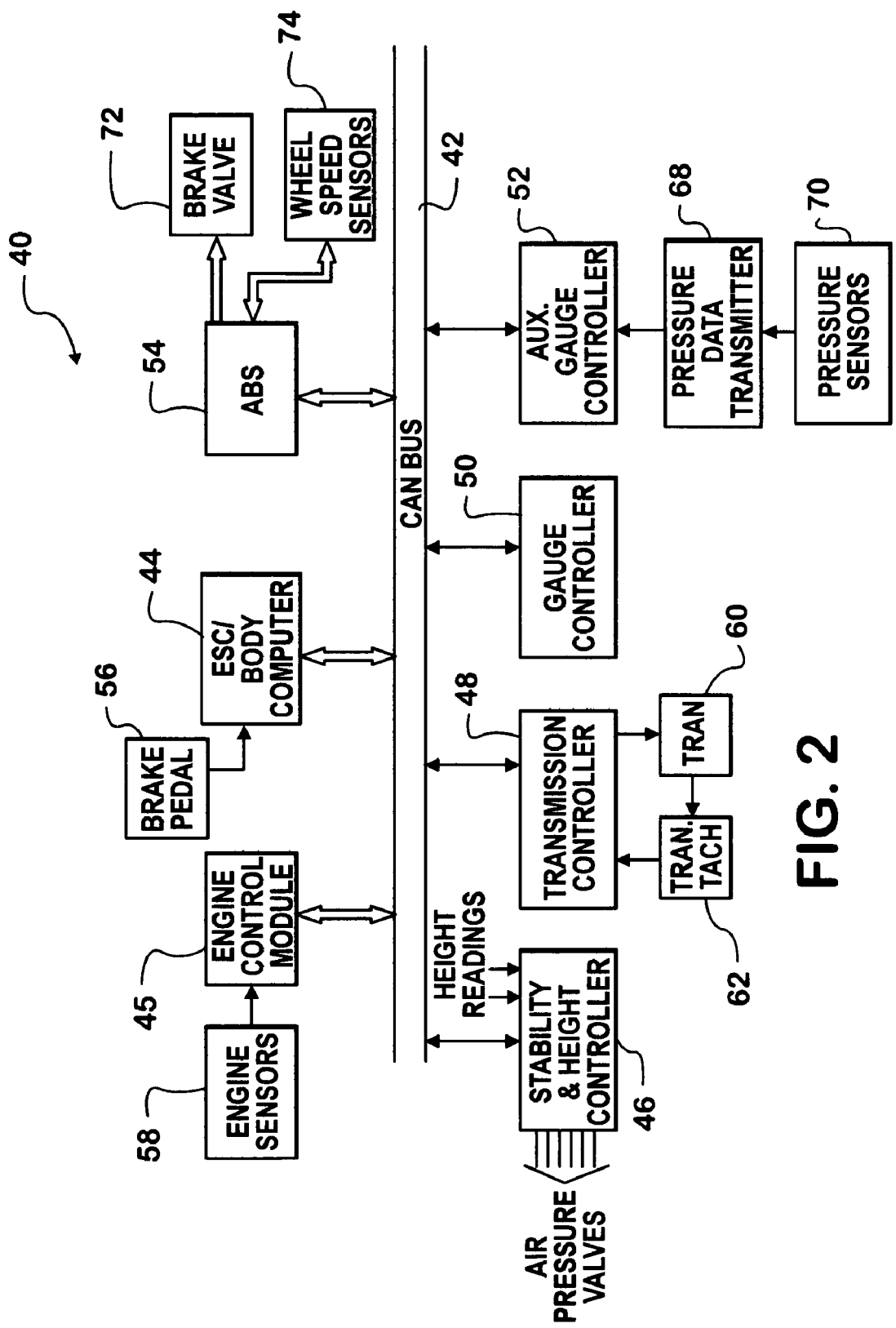
FIG. 2 is a block diagram of a controller area network for a motor vehicle such as shown in FIG. 1.

FIG. 2 illustrates a conventional vehicle electrical control system 40 having a controller area network (CAN) bus 42 as its backbone. CAN bus 42 conforms to the SAE J1939 protocol and provides for data transmission between a plurality of controllers connected to the bus including, an electrical system controller (ESC)/body computer 44, an engine control module 45, a stability and height controller 46, a transmission controller 48, a gauge controller 50, an auxiliary gauge controller 52 and an anti-lock brake system (ABS) controller 54. These controllers are generally attached to one or more devices the status of which may be transmitted over CAN bus 42 by its associated controller for the use of other controllers. For example, engine controller 45 is generally connected to a plurality of engine sensors 58 including, among other sensors, a crankshaft position sensor from which an engine tachometer indication may be developed. Transmission controller 48 controls a transmission 60 the output of which is measured by a drive shaft tachometer 62. This signal may be used to generate a measurement of vehicle speed. A stability and height controller 46 controls the inflation of a plurality of air springs forming part of the vehicle suspension and represents an exogenous user of compressed air which complicates measurements of the performance of an air pressurization system. Gauge controller 50 and auxiliary gauge controllers 52 are often used to collect and format telemetry from vehicle sensors. Here various pressure sensors 70, including an air brake system pressure sensor are shown as monitored by pressure data transmitters 68 connected to the auxiliary gauge controller 52. Under some circumstances air pressure may be reported directly to the engine control module 45 or to body computer 44. ABS controller 54 provides control over brake valves 72 responsive to signals received from body computer 44 and a plurality of wheel speed sensors 74 directly connected to the ABS controller. Body computer 44, which operates as a coordinator between other controllers and is programmable is typically connected to a brake pedal switch 56 and accordingly determines the brake pedal's position. The various connections between sensors and controllers are somewhat flexible. Drive shaft tachometer 62 may be connected to report its output directly to engine control module 45.

Figure 3:
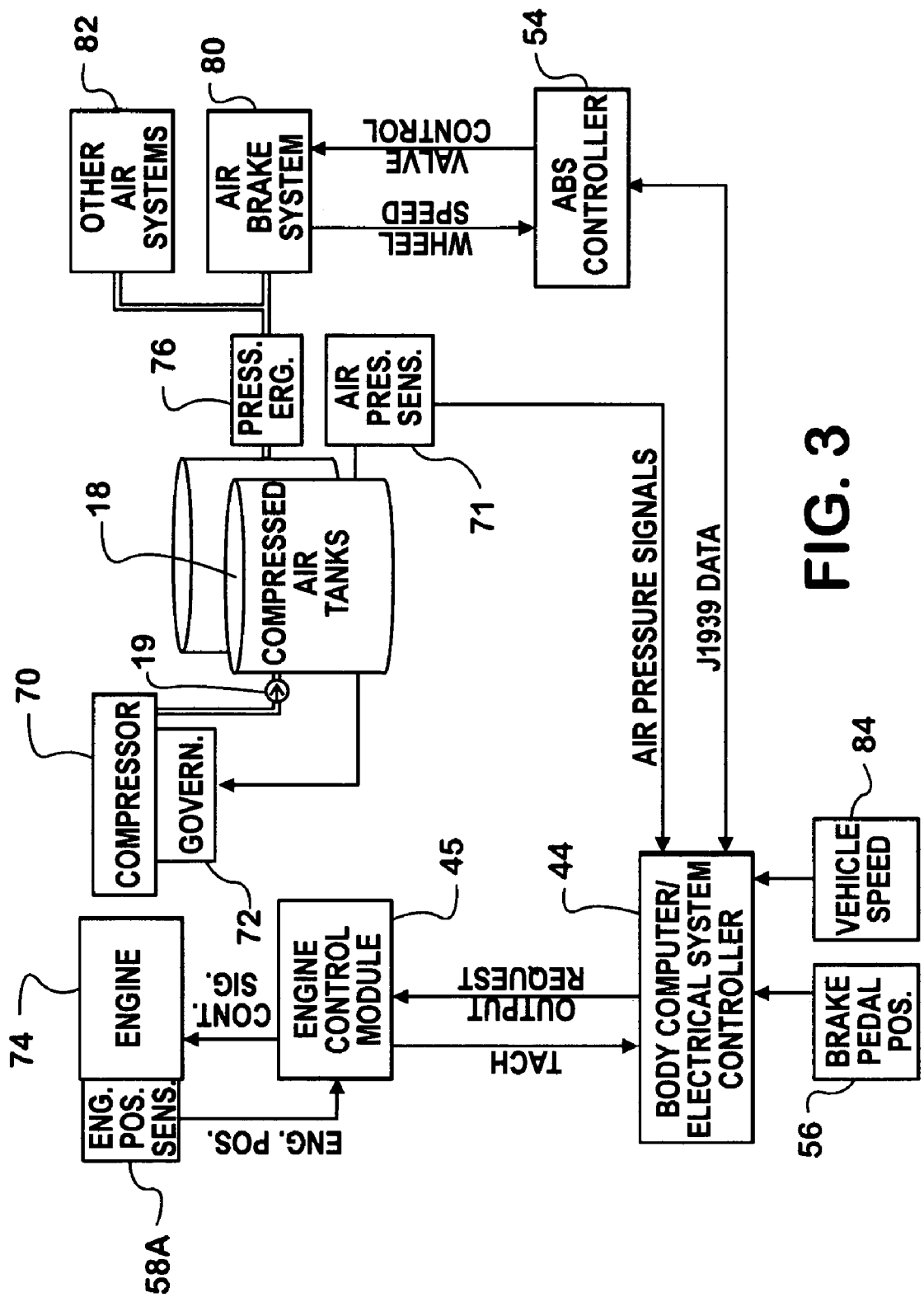
FIG. 3 is a detailed block diagram of interacting components of the controller area network and the air brake system.

FIG. 3 is a schematic illustration of a set of controllers for an air brake system 80 involved in implementing a preferred embodiment of the invention. A vehicle engine 74 is mechanically linked to drive a compressor 70 which supplies air by a check valve 19 to compressed air storage tanks 18. The representation is simplified by not referencing independently such components of a conventional air system such as an air dryer, and not distinguishing between dry tanks and wet tanks. As is conventional, the system is designed to maintain air pressure in a range of 100 to 125 psi. Air pressure is maintained by using a compressor 70 under the control of a governor 72, which is responsive to air pressure communicated on a line to one of compressed air tanks 18, usually a wet tank. Air pressure signals developed by air pressure sensor 71 are passed to body computer 44, typically over CAN bus 42. Air pressure sensor 71 is typically in communication with one of the dry tanks. Where two dry tanks are used either one may be selected, which then becomes the base for all measurements. Body computer 44 receives an engine tachometer signal from engine control module 45, which is derived from an engine crankshaft position sensor 58A. Brake pedal position sensor 56 functions as described above. Vehicle speed 84 is supplied from a transmission controller (not shown) or the engine control module 45, which generate the signal from the drive shaft tachometer. ABS controller 54 and body computer 44 may exchange data relating to air brake system operation 80. The possibility of other air using systems is represented by a general block 82. Air compression systems come in a number of varying types. It is not necessary that the type of system be known in order to use the present invention, which is capable of learning normal values for the system's operation variables.

Body computer 44 may be realized as a programmable, general purpose computer having a CAN interface 98 for transmitting and receiving information over the CAN bus 42. Body computer 44 includes a microprocessor or CPU 90 communicating with CAN interface 98 and memory 94 over an internal bus 97. A program 96 for determining governor cut-in and cut-out pressures and performance is stored in memory 94. The array 95 of values determined is also stored in memory 94. CPU 90 utilizes clock signals from a clock 92 and communicates with external sensors 102 over a local interface 100.

FIG. 5 graphically illustrates typical operational pressure variation for an air brake system. The principal line represents air pressure as periodically sampled. P_min and P_max are variables used by program 96 to determine cut_in and cut_out pressures. Two complete recovery or change cycles (A to B and C to D) and one complete cycle of exhaustion (B to C) are represented. P_max is reset to the current pressure reading on each of occurrence of locking on a cut-in pressure (points A and C). It then tracks the current measured pressure upwardly, ignoring occasional temporary reversals until it locks on a maximum pressure reading (B and D, i.e. cut-out pressure), which it holds until the next minimum. P_min is held at the last detected cut-in pressure (A and C) until a cut-out is detected, whereupon it is reset to the cut-out pressure, which it tracks downwardly until a major turning or deflection point is detected. Points A, B, C and D may be characterized as major deflection points. Points E, F, G and H are minor deflection points resulting from changes in the demand for air, and not cut-in or cut-out of the compressor. Time to rise excludes period following negative turning minor deflection points (E and G) until pressure recovers to the level where a negative turning minor deflection point occurred.

Figure 6A:
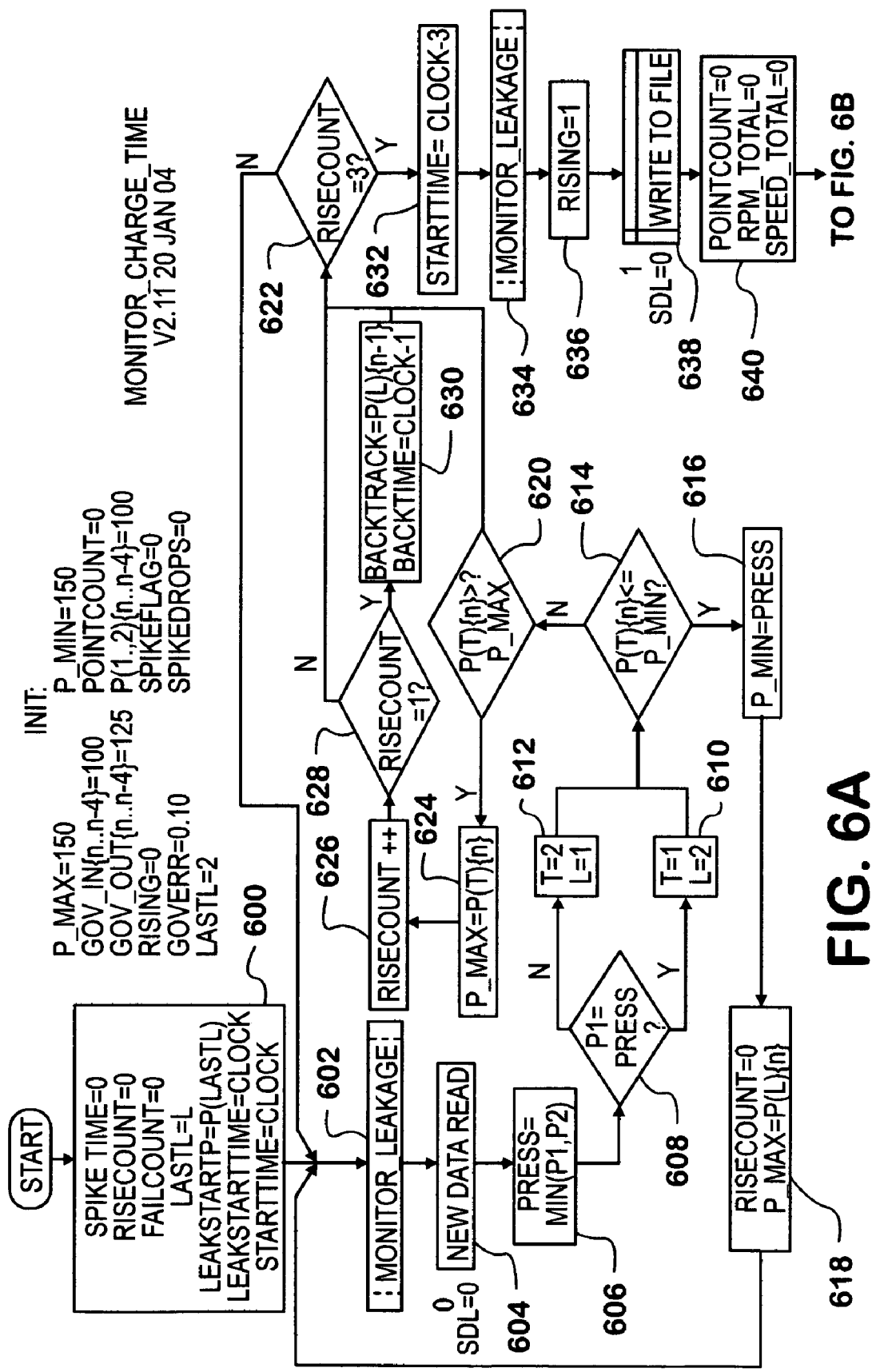
FIG. 6 is a flow chart illustrating operation of the determination algorithm for a compressed air system.
Figure 6B:
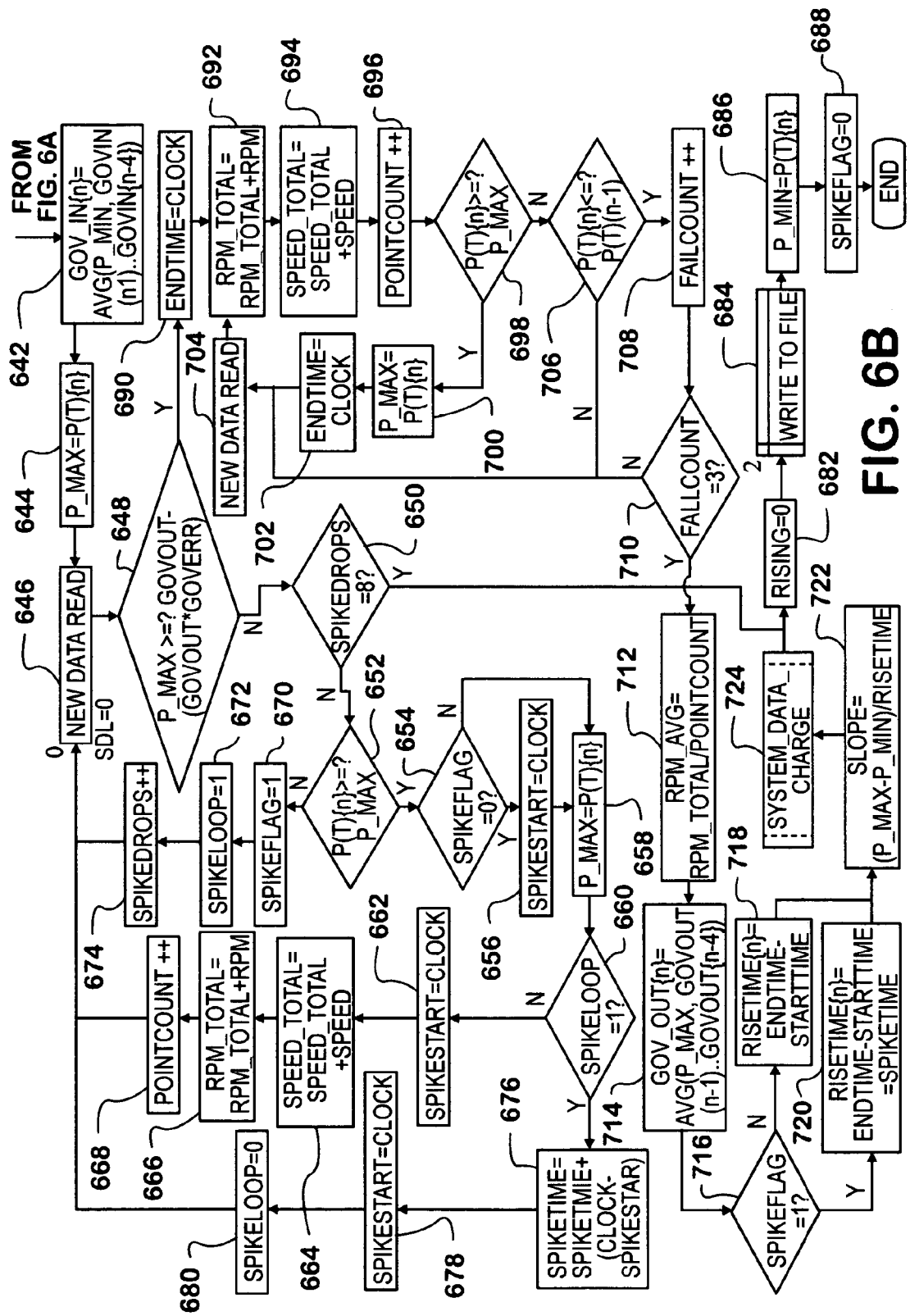

Referring now to FIG. 6 a flow chart illustrates program 96 which is executed on electrical system controller 44 for determining and updating governor cut-in and governor cut-out points for a vehicle air pressurization system of unknown operating characteristics. Program initialization includes definition of a list of variables (Init), which includes initial estimates of governor cut-in and cut-out pressures. The "Init" variables are set once on initial execution of program 96 on body computer 44. The program thereafter use values for the variables developed by the program. Other variables are initialized every time the program is called as indicated at Step 600. Governor cut-in and cut-out are reflected in variable stacks [Gov_In(n, . . . , n-4); Gov_Out (n, . . . , n-4)]. Governor cut-in and cut-out are determined from an average of the current measurement (n) and the four most recent measurements (n-1, n-2, n-3 and n-4). Cut-in should occur at about 100 psi and so all five variables in the stack used for estimating cut-in are initially set to 100. Cut-out should occur at about 125 psi and the five variables for estimating cut-out are initially set to 125. Two variables, P_max and P_min, are provided which will indicate the end and start points, respectively, of a period of increasing pressure, allowing a determination of the rise slope to be made. Both variables are initially given values far higher than should ever appear, that is 150 and will, upon a successful test, be inserted at the top of the stacks Gov_In, Gov_Out. PointCount indicates the current sample count, and is initially 0. Two variable stacks P(1,2){n . . . n-4}=100 provide first in/first out temporary storage of current pressure measurements. Rising, SpikeFlag, SpikeTime and LastL are flags. GovErr is an error factor. LeakStartTime and StartTime are set to the current system clock.

Step 602 indicates entry to a rise detection phase of the program, where it is assumed that the compressor is cut-out and the system is losing air pressure due to leakage. Pressure readings P(1) and P(2) for the current period n are taken as indicated at step 604 and the measurements compared to find the lower of the two to which the variable Press is set equal. At step 608 it is determined if the variable Press has been set equal to the reading P(1). If YES, flags T and L are set to 1 and 2, respectively (step 610), in NO, flags T and L are set to 2 and 1, respectively (step 612). Following step 610 or 612 a comparison is executed to determine if one of variables P(T){n} (i.e. P(1){n} or P(2){n} where n is the current period) is less than or equal to P_min. Initially the result of the comparison is almost always "YES" since P_min is 150 and any pressure measurement should be less than 125. Along the YES branch from the comparison P_min is reset to equal Press (step 616), the counter RiseCount is set equal to 0 and P_max is set equal to P(T){n}. Later instances of execution of steps 616 and 618 will be triggered by falling or steady pressure since P_min will be determined by readings from the prior periods. The program executes a return to step 602 and another set of samples P1, P2 is read.

Consider now the NO branch from the comparison test of step 614. Another comparison step 620 is executed to compare P(T){n} to P_max to determine if P(T){n} is greater than P_max. P_max will always be one of P(T){n-1, n-2, n-3, or n-4} so P(T){n} (see steps 618, 624), which is a current sample, is being compared with an earlier sample in its stack. If the comparison fails execution follows the NO branch to comparison step 622 where it is determined if the counter variable RiseCount has reached its limit value. Because RiseCount has not yet been incremented, and was initially set to 0, the NO branch from step 622 is followed back to step 602 for depression of the stack and the collection of another set of samples. Where P(T){n} is greater than P_max, indicating an increase in the current pressure measurement over any previous recent pressure measurements, execution proceeds along the YES branch from step 620 to step 624, where P_max is reset to P(T){n}. Next, at step 626 the variable RiseCount is incremented and at step 628 it is determined if RiseCount is equal to 1, which will occur only on the first occasion of detection of a possible series of increasing pressure readings. This is the occasion of setting of two variables BackTrack and BackTime to the values P(L){n-1} and Clock-1, respectively (step 630). Following step 630 execution returns to step 602 through decision step 622. Only following a "No" determination at step 628 can RiseCount time out, indicating the occurrence of three increases in the maximum pressure reading with a change in the minimum pressure reading. This is taken as an indication of rising pressure.

The pressure rise detected portion of the algorithm requires initialization of several variables and counters as indicated in steps 632, 636, and 640. The variables include "StartTime" which is initialized at the value "Clock-3"; "Rising", which is set to 1; and three variables, "Point-Count", "RPM_total" and "Speed_total", all of which are set to 0. The variables allow adjustments to the measurement of pressure rise time to compensate for engine and vehicle speed. Leakage continues to be monitored (step 634) and data is recorded (step 638). These operations support other operations. Governor cut-in pressure is recalculated each time rise detection is initiated and is made equal to the five most recently calculated cut-in pressures as represented by taking the average of P_min, GovIn{n-1}, GovIn{n-2}, GovIn{n-3}, and GovIn{n-4} at step 642. The variable P_max is confirmed to be P(T){n} at step 644 and new data is read, resetting P(T){n}, at step 646.

Before the new pressure readings are used for comparison tests the old P_max, carried over from the rise detection phase of the algorithm, is compared to cut-out pressure, less an error factor (GovOut*GovErr), at step 648. Ordinarily, it would be expected that the P_max value has been reset to a value in the P(T) stack at step 624, and should be less than this value and accordingly processing advances along the NO branch to step 650, where it is determined if the counter "SpikeDrops", which is initially 0, has counted out. If NO, step 652 is executed to determine if pressure has continued to rise and a current pressure measurement P(T){n} is compared to P_max to determine if it is at least equal to the pressure reading from the previous measurements. Normally, on the occasion of the first local instance of execution of the step, the value for P(T){n} can be expected to exceed that for P_max. If it does, the YES branch from step 652 leads to execution of a another comparison test, step 654, is executed to determine the value of a flag "SpikeFlag", which indicates occurrence of a drop in the current pressure measurement since the most recent detection of rising pressure, i.e. since the last instance of compressor cut-in. The expected value is 0, whereupon process execution skips to step 658, where P_max is reset to the current pressure measurement. If the spike flag is set, step 656 precedes execution of step 658 and the variable "SpikeStart" is set to the current clock for accumulation of rise time.

Following step 658, a determination is made if the "SpikeLoop" flag has been set, indicating that an immediately previous occurrence of a current pressure reading falling below the prior period's pressure reading, as detected at step 652. If not, execution proceeds along the branch from step 660 leading to steps 662, 664, 666 and 668. These steps reflect the resetting or incrementation of several variables, including, respectively, resetting "SpikeStart" equal to the current clock; resetting "Speed_Total" to the sum of the previous Speed_Total and current speed measurement; resetting "RPM_Total" to equal to the sum of the old RPM_Total and the current measured RPM; and finally incrementing the counter "PointCount", which will reflect the number of times Speed_Total and RPM_Total are incremented to allow calculation of an average for the two variables. Following step 668 processing returns to step 646 and a new set of variables are read.

Returning to step 652, the case where the current pressure measurement P(T){n} falls, or has remained, below a prior measurement during the current rise detected phase of the algorithm is considered. Following the NO branch from step 652 it may be seen that steps 670, 672 and 674 are executed, which in turn set "SpikeFlag" to 1, "SpikeLoop" to 1 and increment the counter "SpikeDrops". SpikeDrops is the most significant of these since its accumulation to a value equal to 8 aborts the rise detect portion of the algorithm, as detected at step 650. The YES branch from step 660 is followed only after a prior pass through steps 670, 672 followed by an indication that pressure is again rising. Steps 676, 678 and 680 provide for resetting "SpikeTime" to the old value for SpikeTime plus the current Clock less the time for "SpikeStart". In other words, the elapsed time corresponding to a period when pressure is dropping or is rising, but has not yet recovered to the point where the interruption occurred is accumulated in "SpikeTime". SpikeStart is then set to the current clock and the SpikeLoop flag is reset to 0. Processing returns to step 646 for the collection of new data.

As stated above, accumulation of a "SpikeDrops" count equal to 8 results in the process being aborted. No updates to governor cut_out occur under these circumstances as the process is advanced to a series of exit steps which reflect resetting variables for the next iteration of the leak monitoring and rise detection steps including steps 602 through 630. These steps include resetting the flag termed "Rising" to 0 (step 682), writing data to a file (step 684), resetting P_min to the current pressure measurement P(T){n} (step 686) and resetting the SpikeFlag to 0 (step 688) before the algorithm is exited.

Returning to step 648, the steps of the algorithm occurring once P_max has reached a value close to the governor cut-out pressure less an error factor are considered. Following the YES branch from step 648, timing of rise time must discontinue and accordingly a variable "EndTime" is set equal to the current clock reading (step 690), anticipating that the compressor has been cut out. Next, at steps 692 and 694 the variables RPM_total and Speed_total are reset and the counter PointCount incremented, tracking steps 664 through 668. RPM's and speed are tracked for the use of other processes. Risetime will vary as a function of engine RPM's. At this point in the process declining pressure is taken as confirmation of compressor cut-out. The current pressure measurement is compared to P_max at step 698. If the current measurement at least equals P_max, indicating the cut-out has not occurred, P_max is reset to the current pressure measurement, the variable EndTime is reset to the current clock (steps 700, 702) and another set of pressure measurements is taken (step 704). Otherwise, the NO branch from step 698 results in execution of a comparison (step 708) between the current measurement and the pressure measurement for the immediately preceding period. If the current measurement reflects an increase in pressure, processing returns to step 704 for yet another round of data measurements. If the current measurement indicates that pressure is steady or falling since the last measurement, the variable FallCount is incremented and at step 710 it is determined if FallCount has reached a value high enough to trigger an exit from the loop. If not, processing loops back through step 704 for still more pressure measurements. If YES, processing advances to steps providing from redetermination of the expected Governor cut-out pressure level.

The invention provides for determining both the expected governor cut-out pressure level and the expected rise time from cut-in to cut-out, ignoring intervening demands for air pressure and recovery. Expected rise time may require consideration of operating conditions. First, at step 712, the average of engine RPM measurements made during the rise detected portion of the algorithm is made. Step 712 provides for determining the average "RPM_avg" from the accumulated RPM measurements divided by the number of samples "PointCount". Next, at step 714, a new, current governor cut-out pressure level is determined by averaging the final value for P_max with the prior four determinations of the governor cut-out pressure level. The oldest value is discarded. Rise time determinations take account of interruptions in pressure increase by determining first if any such interruption occurred. Step 716 checks the flag SpikeFlag. If the flag has not been set RiseTime is simply the EndTime of the rise detect portion of the algorithm less its StartTime (step 718). Otherwise RiseTime is adjusted to exclude what is termed "SpikeTime" which accumulated over periods when declining pressure measurements, and recovery from the period, occurred (step 720). The time rate of change of pressure over time may now be calculated by subtracting final maximum pressure from the initial minimum pressure and dividing the result by RiseTime (step 722) from either step 718 or 720. The final step preceding the reset steps, step 724, provides storage of the calculated slope as "System_Data_Change".

The invention provides an automatic system allowing vehicles to determine normal compressor system operating variables notwithstanding differences in air pressurization systems from vehicle to vehicle. There is no need for vehicle drivers or operators to provide, or guess at, manufacturer's specifications in implementing an inspection regimen. The possibilities for operator error are reduced. A system automatically compensates for some extraneous demands on compressed air availability.

While the invention is shown in only one of its forms, it is not thus limited but is susceptible to various changes and modifications without departing from the spirit and scope of the invention.

What is claimed is:

1. Apparatus for determining normal operating variables for an unknown compressed air system pressure installed on a motor vehicle, including a compressor and a governor providing cut-in and cut-out pressure of the compressor, the apparatus comprising:
   an air pressure sensor located in communication with the compressed air system for sensing air pressure and generating an air pressure signal;
   a source of a clock signal; and
   an information processor connected to receive the air pressure signal and utilizing the clock signal which is programmed to determine variation in air pressure over time, and to determine cut-in and cut-out pressure from detected major deflection points in the air pressure signals; and
   the information processor being further programmed to determine use times between minimum major deflection points and maximum major deflection points, excluding periods where pressure falls below a the measured value of a negative turning minor deflection point.

2. Apparatus as set forth in claim 1, further comprising:
   means for averaging recent deflection point pressure readings, as indicators of a compressor cut-in and cut-out pressure.

3. A method of characterizing a compressed air system for a motor vehicle comprising the steps of:

obtaining air pressure readings from an air pressure sensor located in communication with the air compression system;

determining major air pressure change deflection points;

utilizing recently determined major air pressure deflection points to determine expected air compressor cut-in and cut-out pressure points;

calculating a pressure rise time between major deflection points bounding a minimum deflection point and a subsequent maximum deflection point and excluding intervening periods where pressure is below a level of a negative turning minor deflection point; and determining a rise slope from the calculated pressure rise time.

4. The method of claim 3, wherein the step of utilizing recently determined major air pressure deflection points involves averaging the most recently determined major air pressure deflection points.

* * * * *